United States Patent
Xie

(10) Patent No.: US 9,897,864 B2
(45) Date of Patent: Feb. 20, 2018

(54) CURVED DISPLAY PANEL COMPRISING A SUBSTRATE EDGE HAVING RECESSES AT POSITIONS CORRESPONDING TO A PLURALITY OF SPACERS AND ELECTRONIC APPARATUS

(71) Applicants: Shenzhen China Star Optoelectronics Technology Co., Ltd., Shenzhen, Guangdong (CN); Wuhan China Star Optoelectronics Technology Co., Ltd., Wuhan, Hubei (CN)

(72) Inventor: Chang Xie, Guangdong (CN)

(73) Assignees: Shenzhen China Star Optoelectronics Technology Co., Ltd, Shenzhen, Guangdong (CN); Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 288 days.

(21) Appl. No.: 14/902,557

(22) PCT Filed: Oct. 23, 2015

(86) PCT No.: PCT/CN2015/092762
§ 371 (c)(1),
(2) Date: Dec. 31, 2015

(87) PCT Pub. No.: WO2017/049701
PCT Pub. Date: Mar. 30, 2017

(65) Prior Publication Data
US 2017/0235177 A1    Aug. 17, 2017

(30) Foreign Application Priority Data
Sep. 24, 2015 (CN) .......................... 2015 1 0618246

(51) Int. Cl.
*G02F 1/1339*    (2006.01)
*G02F 1/1335*    (2006.01)

(52) U.S. Cl.
CPC .... *G02F 1/13394* (2013.01); *G02F 1/133514* (2013.01); *G02F 2201/56* (2013.01); *G02F 2202/02* (2013.01)

(58) Field of Classification Search
CPC ....... G02F 2001/13396; G02F 2202/02; G02F 2201/56; H01L 27/1262
See application file for complete search history.

(56) References Cited

U.S. PATENT DOCUMENTS

| 5,307,190 A * | 4/1994 | Wakita .............. G02F 1/133305 349/153 |
| 2005/0117197 A1* | 6/2005 | Ide ........................ G02F 1/1333 359/291 |

(Continued)

FOREIGN PATENT DOCUMENTS

| CN | 101806970 A | 8/2010 |
| CN | 102681180 A | 9/2012 |

(Continued)

*Primary Examiner* — Paul Lee
(74) *Attorney, Agent, or Firm* — Andrew C. Cheng

(57) ABSTRACT

The present invention provides a curved display panel, comprising a color filter substrate, an array substrate and a plurality of spacers, and the color filter substrate and the array substrate are curved, and the plurality of spacers is positioned between the color filter substrate and the array substrate, and an edge of one of the color filter substrate and the array substrate comprises recesses at positions corresponding to the spacers, a center of one of the color filter substrate and the array substrate comprises bulges at positions corresponding to the spacers. By the method in which the recesses are positioned at the edge and the bulges are positioned at the center, the cell gaps at respective positions in the curved display panel are the same.

18 Claims, 3 Drawing Sheets

(56) References Cited

U.S. PATENT DOCUMENTS

| | | | |
|---|---|---|---|
| 2008/0055531 A1* | 3/2008 | Lin | G02F 1/13394 349/155 |
| 2009/0284904 A1* | 11/2009 | Wu | G02F 1/133305 361/679.01 |
| 2010/0289996 A1 | 11/2010 | Wang et al. | |
| 2011/0228190 A1* | 9/2011 | Yang | G02F 1/13394 349/56 |
| 2012/0020056 A1* | 1/2012 | Yamagata | G02F 1/133308 362/97.1 |
| 2012/0044618 A1* | 2/2012 | Lee | 361/679.01 |
| 2012/0168058 A1* | 7/2012 | Kim | B29D 11/0073 156/101 |
| 2013/0180653 A1* | 7/2013 | Kim | G02F 1/133305 156/257 |
| 2014/0092350 A1 | 4/2014 | Byeon et al. | |

FOREIGN PATENT DOCUMENTS

| | | |
|---|---|---|
| CN | 104375333 A | 2/2015 |
| CN | 104483773 A | 4/2015 |
| CN | 204631406 U | 9/2015 |
| JP | H07301789 A | 11/1995 |
| JP | H11262828 A | 9/1999 |
| KR | 101519844 B1 | 5/2015 |
| TW | 201133430 A | 10/2011 |
| TW | 411985 B | 10/2013 |

* cited by examiner

CURVED DISPLAY PANEL COMPRISING A SUBSTRATE EDGE HAVING RECESSES AT POSITIONS CORRESPONDING TO A PLURALITY OF SPACERS AND ELECTRONIC APPARATUS

CROSS REFERENCE

This application claims the priority of Chinese Patent Application No. 201510618246.X, entitled "Curved display panel and electronic apparatus", filed on Sep. 24, 2015, the disclosure of which is incorporated herein by reference in its entirety.

FIELD OF THE INVENTION

The present invention relates to a display technology field, and more particularly to a curved display panel and an electronic apparatus.

BACKGROUND OF THE INVENTION

With the progress of the optoelectronics and semiconductor technologies, the flourishing development of the Flat panel display comes along therewith. Recently, many big makers sell curved displays in succession. Overall, the best watch result can be provided from the center of the curved display to the edge, and the display result at the screen edge of the normal flat display has not been well. The entire screen of the curved display utilizes a surrounding arc design toward the user, which can provides a wide, panoramic image effect. No matter at the center or the surround edges of the screen, the user can enjoy the same visual experiences. Moreover, the distortion of off-axis viewing can be decreased in a short distance. Besides, the curved display can make the watch distance of the user be longer to realize a better viewing experience. Compared with the normal flat display, the curved display has great advantages, such as 1. brand differentiation; 2. wider visible angle; 3. less distortion of off-axis viewing in short distance. Therefore, the curved screen display will become more and more popular.

In prior arts, the curved liquid crystal display panel is to sandwich the liquid crystal layer with two flat glass substrates, and then to fix the two glass substrate and the liquid crystal layer with a curved iron frame for making the liquid crystal display panel appear to be in a bent state. However, the iron frame does not evenly apply force to the two glass substrate, and the stress concentration degrees at the edge and the center of the glass substrates are different. Accordingly, it is common that the cell gap of the two glass substrate at the center is smaller than the cell gap at the edge in the curved liquid crystal display panel. Consequently, it results in the abnormal display of the curved liquid crystal display panel.

SUMMARY OF THE INVENTION

For solving the aforesaid problem, an objective of the present invention is to provide a curved display panel for solving the issue that the unequal cell gap between the two glass substrates influences the display quality.

Another objective of the present invention is to provide an electronic apparatus utilizing the aforesaid curved display panel.

For realizing the aforesaid objective, the technical solution provided by the embodiments of the present invention is:

The present invention provides a curved display panel, comprising a color filter substrate, an array substrate and a plurality of spacers, and the color filter substrate and the array substrate are curved, and the plurality of spacers is positioned between the color filter substrate and the array substrate, and an edge of one of the color filter substrate and the array substrate comprises recesses at positions corresponding to the spacers, a center of one of the color filter substrate and the array substrate comprises bulges at positions corresponding to the spacers.

The bulges and the corresponded spacers are formed in on body.

One of the color filter substrate and the array substrate and the bulges are formed in on body.

Heights of the plurality of spacers along a direction which is vertical to a surface of the color filter substrate and the array substrate are the same.

The bulges are made of organic material.

The recesses are positioned on the color filter substrate.

The spacers are made of elastic material.

Material of the spacers is resin, rubber or foam.

A curvature radius of the color filter substrate is smaller than a curvature radius of the array substrate.

The present invention further provides an electronic apparatus, comprises a curved display panel, wherein the curved display panel comprises a color filter substrate, an array substrate and a plurality of spacers, and the color filter substrate and the array substrate are curved, and the plurality of spacers is positioned between the color filter substrate and the array substrate, and an edge of one of the color filter substrate and the array substrate comprises recesses at positions corresponding to the spacers, a center of one of the color filter substrate and the array substrate comprises bulges at positions corresponding to the spacers.

The bulges and the corresponded spacers are formed in on body.

One of the color filter substrate and the array substrate and the bulges are formed in on body.

Heights of the plurality of spacers along a direction which is vertical to a surface of the color filter substrate and the array substrate are the same.

The bulges are made of organic material.

The recesses are positioned on the color filter substrate.

The spacers are made of elastic material.

Material of the spacers is resin, rubber or foam.

A curvature radius of the color filter substrate is smaller than a curvature radius of the array substrate.

In the present invention, by the method of changing the thickness at the positions cooperating with the spacers in the curved display panel, specifically in which the recesses are positioned at the edge and the bulges are positioned at the center, the function of cell gap regulation at various positions in the curved display panel can be achieved to make the cell gaps at respective positions in the curved display panel be the same. The bad phenomenon of display image distortion, color abnormity due to the cell gap difference can be avoided to promote the display result of the curved display panel.

BRIEF DESCRIPTION OF THE DRAWINGS

In order to more clearly illustrate the embodiments of the present invention or prior art, the following figures will be described in the embodiments are briefly introduced. It is

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are part of embodiments of the present invention, but not all embodiments. Based on the embodiments of the present invention, all other embodiments to those of ordinary skill in the premise of no creative efforts obtained, should be considered within the scope of protection of the present invention.

Figure 1A:
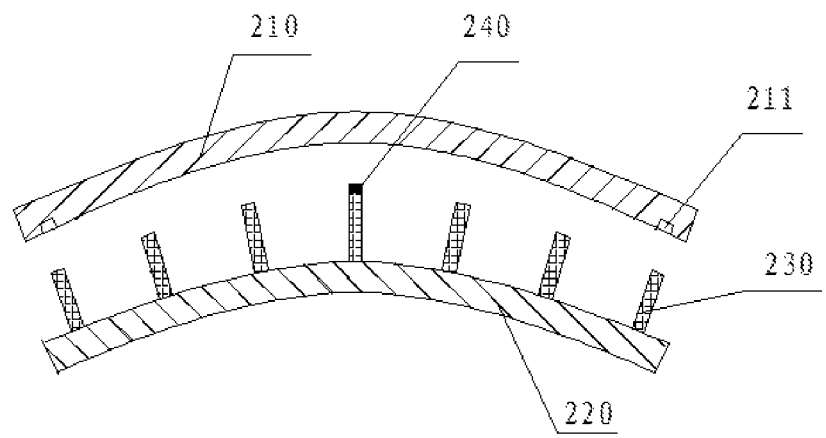
FIG. 1A is a structure decomposition diagram of the first embodiment according to the present invention.
Figure 1B:
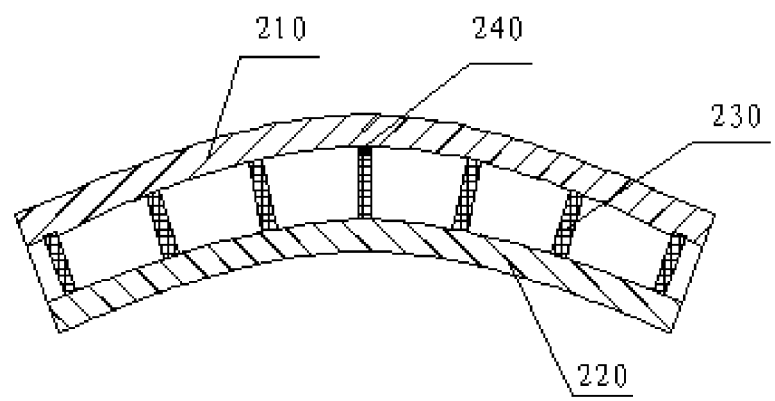
FIG. 1B is a structure diagram of the curved display panel shown in FIG. 1A.

Please refer to FIG. 1A and FIG. 1B. The curved display panel according to the first embodiment of the present invention can comprises: a color filter substrate 210, an array substrate 220 and spacers 230 positioned between the color filter 210 and the array substrate 220. The color filter substrate 210 and the array substrate 220 are curved, and an edge of the color filter substrate 210 comprises recesses 211 at positions corresponding to the spacers 230. In other words, the edge of the color filter substrate 210 comprises the recesses 211, and the spacers 230 at the edge of the color filter substrate 210 can be partially adapted in the recesses 211 to diminish the cell gap of the edge of the curved display panel. A center of the color filter substrate 210 comprises bulges 240 at positions corresponding to the spacers 230. The cell gap of the center of the curved display panel can be increased with the bulges 240. Obviously, in this embodiment, the bulges 240 also can be positioned at positions in the center of the array substrate 220 corresponding to the spacers 230.

Furthermore, the color filter substrate 210 and the array substrate 220 are curved, and a concave surface of the array substrate 220 is away from the color filter substrate 210, and the concave surface of the color filter substrate 210 is the surface close to the array substrate 220. In other words, a curvature radius of the color filter substrate 210 is smaller than a curvature radius of the array substrate 220.

Furthermore, the material of the bulges 240 can be photoresist, benzocyclobutene, cycloalkene, polyimide, polyamide, polyester, polyalcohol, polyethyleneoxide, polystyrene, resinae, polyether, polyketone or other organic materials as illustrations.

Furthermore, the spacers 230 are preferably made of elastic material. For example, resin, rubber or foam can act to have anti-shock result. Besides, heights of the spacers 230 along a direction which is vertical to a surface of the color filter substrate 210 and the array substrate 220 are the same. Thereby, the entire thickness of the liquid crystal display module can be ensured to be even and equal.

The stress at the center position of the curved display panel is the largest, and the deformation of the spacers at this position is the biggest, thus, the cell gap of the center position is small. The stress at the edge position of the curved display panel is the smallest, and therefore, the deformation of the spacers at this position will be the smallest, and the cell gap at the edge position is larger. In the curved display panel of the present invention, the recesses are located at the edge and the bulges are positioned at the center. The spacers at the center cooperate with the bulges to increase the cell gap at the center of the curved display panel, and the spacers at the edge cooperate with the recesses to diminish the cell gap at the edge. With the aforesaid regulation, the cell gaps at respective positions in the curved display panel are roughly the same. The bad phenomenon of display image distortion, color abnormity due to the cell gap difference can be avoided to promote the display result of the curved display panel.

Figure 2A:
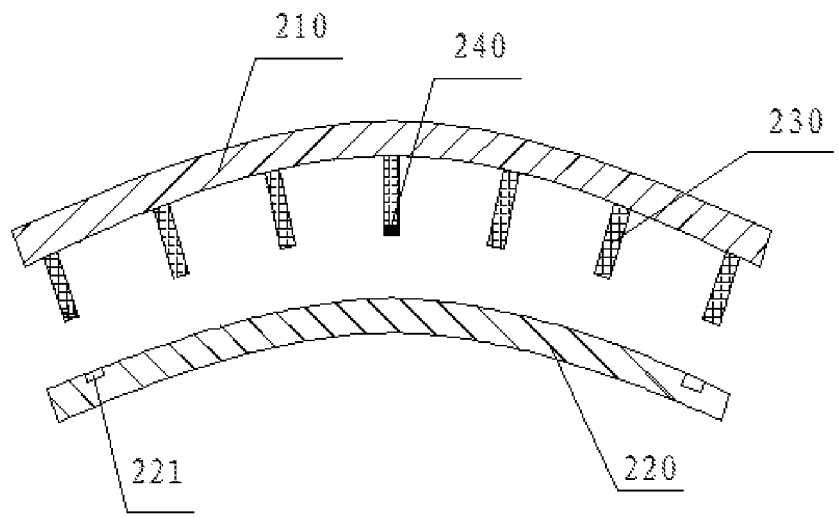
FIG. 2A is a structure decomposition diagram of the second embodiment according to the present invention.
Figure 2B:
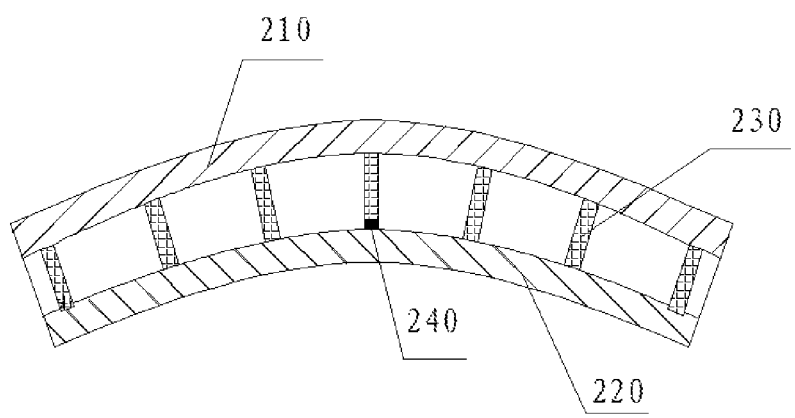
FIG. 2B is a structure diagram of the curved display panel shown in FIG. 2A.

Please refer to FIG. 2 and FIG. 2B. The difference of the second embodiment of the present invention from the first embodiment is that the recesses 221 are positioned on the array substrate 220, and the spacers 230 at the edge of the array substrate 220 can be partially adapted in the recesses 211 to diminish the cell gap of the edge of the curved display panel. A center of the array substrate 220 comprises bulges 240 at positions corresponding to the spacers 230. The cell gap of the center of the curved display panel can be increased with the bulges 240. In this embodiment, similarly, the cell gap of the edge of the curved display panel can be diminished and the cell gap of the center can be increased to make the cell gaps at respective positions in the entire curved display panel be the same. Obviously, in this embodiment, the bulges 240 also can be positioned at positions in the center of the color filter substrate 210 corresponding to the spacers 230.

Furthermore, the color filter substrate 210 and the array substrate 220 are curved, and a concave surface of the array substrate 220 is away from the color filter substrate 210, and the concave surface of the color filter substrate 210 is the surface close to the array substrate 220. In other words, a curvature radius of the color filter substrate is larger than a curvature radius of the array substrate.

Furthermore, the material of the bulges 240 can be photoresist, benzocyclobutene, cycloalkene, polyimide, polyamide, polyester, polyalcohol, polyethyleneoxide, polystyrene, resinae, polyether, polyketone or other organic materials as illustrations.

Furthermore, the spacers 230 are preferably made of elastic material. For example, rubber, foam and etc. can act to have anti-shock result. Besides, heights of the spacers 230 along a direction which is vertical to a surface of the color filter substrate 210 and the array substrate 220 are the same. Thereby, the entire thickness of the liquid crystal display module can be ensured to be even and equal.

In other embodiments, the bulges 240 can be a part of the color filter substrate 210. In other words, the bulges 240 and the color filter substrate 210 are formed in on body. Similarly as described in the aforesaid embodiment, the bulges 240 can be positioned at positions in the center of the color filter substrate 210 corresponding to the spacers 230.

In other embodiments, the bulges 240 can be a part of the array substrate 220. In other words, the bulges 240 and the array substrate 220 are formed in on body. Similarly as described in the aforesaid embodiment, the bulges 240 can be positioned at positions in the center of the array substrate 220 corresponding to the spacers 230.

In other embodiments, the color filter substrate 210 and the array substrate 220 are curved, and a concave surface of the array substrate 220 faces the color filter substrate 210, and the concave surface of the color filter substrate 210 is the surface away from the array substrate 220. In other words, a curvature radius of the color filter substrate is smaller than a curvature radius of the array substrate. In such embodiment, it is equivalent to that the facing directions of the color filter substrate 210 and the array substrate 220 in the first embodiment are switched, and other arrangements are remained for satisfying various visual requirements.

Figure 3A:
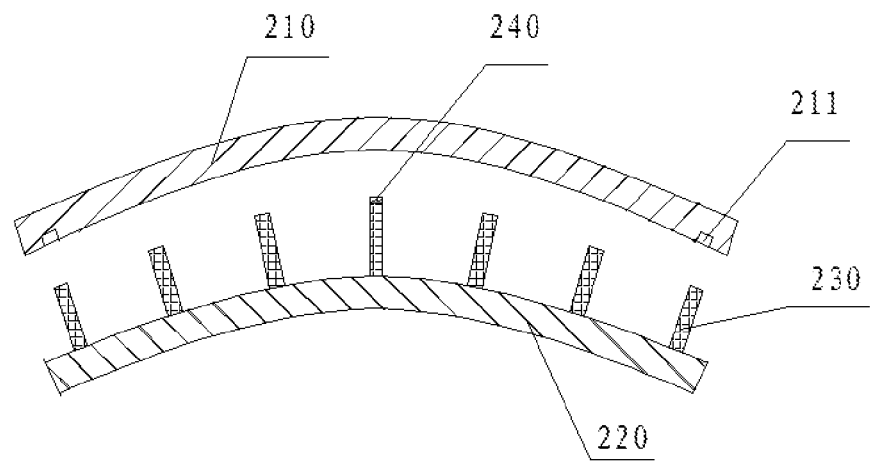
FIG. 3A is a structure decomposition diagram of the third embodiment according to the present invention.
Figure 3B:
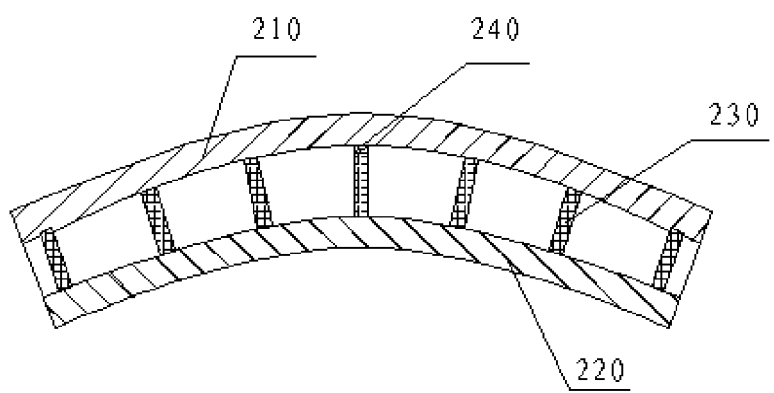
FIG. 3B is a structure diagram of the curved display panel shown in FIG. 3A.

Please refer to FIG. 3A and FIG. 3B. The difference of this embodiment from the first embodiment is that the bulges 240 and the corresponding spacers 230 are formed in one body, and the bulges 240 are a part of the spacers 230. That is to say, the thickness of the spacer at the center of the curved display panel is larger than the thicknesses of the spacers at other positions. In this embodiment, the edge of the color filter substrate 210 similarly comprises the recesses 211, and the spacers 230 at the edge of the color filter substrate 210 can be partially adapted in the recesses 211.

The present invention further discloses an electronic apparatus, and the electronic apparatus comprises any one of the aforesaid curved display panels. The electronic apparatus can be the cell phone, the tablet, the television, the display, the notebook, the digital camera, the navigator and any electronic apparatus with display function.

Above are embodiments of the present invention, which does not limit the scope of the present invention. Any modifications, equivalent replacements or improvements within the spirit and principles of the embodiment described above should be covered by the protected scope of the invention.

What is claimed is:

1. A curved display panel, comprising a color filter substrate, an array substrate and a plurality of spacers, and the color filter substrate and the array substrate are curved, and the plurality of spacers is positioned between the color filter substrate and the array substrate, and an edge of one of the color filter substrate and the array substrate comprises recesses at positions corresponding to the spacers, a center of one of the color filter substrate and the array substrate comprises bulges at positions corresponding to the spacers.

2. The curved display panel according to claim 1, wherein the bulges and the corresponded spacers are formed in on body.

3. The curved display panel according to claim 1, wherein one of the color filter substrate and the array substrate and the bulges are formed in on body.

4. The curved display panel according to claim 3, wherein heights of the plurality of spacers along a direction which is vertical to a surface of the color filter substrate and the array substrate are the same.

5. The curved display panel according to claim 1, wherein the bulges are made of organic material.

6. The curved display panel according to claim 1, wherein the recesses are positioned on the color filter substrate.

7. The curved display panel according to claim 1, wherein the spacers are made of elastic material.

8. The curved display panel according to claim 7, wherein material of the spacers is resin, rubber or foam.

9. The curved display panel according to claim 1, wherein a curvature radius of the color filter substrate is smaller than a curvature radius of the array substrate.

10. An electronic apparatus, comprises a curved display panel, wherein the curved display panel comprises a color filter substrate, an array substrate and a plurality of spacers, and the color filter substrate and the array substrate are curved, and the plurality of spacers is positioned between the color filter substrate and the array substrate, and an edge of one of the color filter substrate and the array substrate comprises recesses at positions corresponding to the spacers, a center of one of the color filter substrate and the array substrate comprises bulges at positions corresponding to the spacers.

11. The electronic apparatus according to claim 10, wherein the bulges and the corresponded spacers are formed in on body.

12. The electronic apparatus according to claim 10, wherein one of the color filter substrate and the array substrate and the bulges are formed in on body.

13. The electronic apparatus according to claim 12, wherein heights of the plurality of spacers along a direction which is vertical to an surface of the color filter substrate and the array substrate are the same.

14. The electronic apparatus according to claim 10, wherein the bulges are made of organic material.

15. The electronic apparatus according to claim 10, wherein the recesses are positioned on the color filter substrate.

16. The electronic apparatus according to claim 10, wherein the spacers are made of elastic material.

17. The electronic apparatus according to claim 16, wherein material of the spacers is resin, rubber or foam.

18. The electronic apparatus according to claim 10, wherein a curvature radius of the color filter substrate is smaller than a curvature radius of the array substrate.

* * * * *